United States Patent
Lin

(10) Patent No.: US 7,283,896 B2
(45) Date of Patent: Oct. 16, 2007

(54) TFT DISPLAY WITH LOW LOSS CONSTRUCTION OF POWER SUPPLY

(75) Inventor: Yet-Zen Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 116 days.

(21) Appl. No.: 11/250,527

(22) Filed: Oct. 17, 2005

(65) Prior Publication Data

US 2006/0139966 A1  Jun. 29, 2006

(30) Foreign Application Priority Data

Dec. 29, 2004 (TW) ............... 93141117 A

(51) Int. Cl.
*G96F 19/00* (2006.01)
(52) U.S. Cl. ............... 701/16; 315/195; 363/17
(58) Field of Classification Search ........ 323/282–288, 323/271–273, 268; 363/21.1–21.9, 21.12; 315/291, 266
See application file for complete search history.

(56) References Cited

U.S. PATENT DOCUMENTS 6,912,139 B2 * 6/2005 Kernahan et al. ............. 363/41

* cited by examiner

Primary Examiner—Rajnikant B. Patel
(74) Attorney, Agent, or Firm—Bacon & Thomas, PLLC

(57) ABSTRACT

This present invention relates to a TFT display with low loss construction of power supply to be used in a monitor. The invention includes two independent transformer rectifier circuits, thus when the monitor is in its power-saving mode, it requires only one transformer rectifier circuit to provide the required voltage in the power-saving mode. When the user wishes to restore the monitor to its normal mode, the two transformer rectifier circuits will be turned on simultaneously to reduce the power consumed in the power-saving mode. Thus, the purpose of saving power can be attained.

8 Claims, 2 Drawing Sheets

TFT DISPLAY WITH LOW LOSS CONSTRUCTION OF POWER SUPPLY

BACKGROUND OF THE INVENTION

1. Field of the Invention

The present invention relates to a low construction of power supply; more particularly, to a TFT display with low loss construction of power supply to be used in monitoring in a power saving mode of the system.

2. Description of Related Art

Accompanying the flourishing of the industry, monitors have been transformed from the traditional CRT to the contemporary LCD. As shown in FIG. 1, an LCD 10 uses cold cathode rays 20 to radiate light, however, a supply voltage as high as 1200 volts DC has to be provided by a power supply device 110. One inverter 19 is thus required to transform the direct low-voltage (such as 24 volts) to high-voltage wherein the low voltage of 24 volts is provided by a transformer rectifier circuit 12. The transformer rectifier circuit 12 receives AC voltage inputted by an external device and is then processed by a rectifier filter circuit 11. After the AC voltage is transferred to the transformer rectifier circuit 12 and then processed by a feedback controller 13, the AC voltage is transformed to DC voltage and transferred to a frequency modulator 19 to provide the cold cathode rays voltages for processing displaying functions.

When the LCD 10 is not in use, whether it is turned off manually or shifted into a stand-by mode by the computer mainframe, both statuses are called a power-saving mode. As shown in FIG. 1, with the structure of the prior LCD 10 and its power supply 101, when LCD 10 is in the power-saving mode, a voltage of 5 volts needed by the microprocessor 18 is still required to be transferred from the 24 volts transformer rectifier circuit 12 to a 5 volts rectifier filter circuit 14. When transformer rectifier circuit 14 receives the 24 volts voltage from a transformer rectifier circuit 12, the voltage will be transformed into 5 volts and then outputted to a microprocessor 18. Moreover, due to the 5 volts voltage being unstable when first outputted, the feedback controller 15 is used to gradually modulate the voltage to a stable state. Therefore, although the prior art is in power-saving mode, it still requires the 24 volts transformer rectifier circuit 12 to provide the 5 volts voltage, meaning the 24 volts transformer rectifier circuit 12 still has to continue to function. Thus, although the inverter 19 is power-off when the prior LCD 10 is in its power-saving mode, there will still be some leaking current and the occurrence of power consumption due to the necessity of the continuing work of the transformer rectifier circuit 12. Power consumption not only causes higher expense for the user, but also produces unnecessary waste of resources that results in problems during use.

SUMMARY OF THE INVENTION

The present invention mainly discloses a TFT display with low loss construction of power supply to be used in a monitor to receive one analog computer image signal and provide a secondary DC voltage to the inverter of the monitor. The inverter can provide the required electric power for functioning of the monitor. The TFT display with low loss construction of power supply comprises: a rectifier filter circuit, used to input an AC voltage and output a first DC voltage; a first transformer rectifier circuit, used to input a first DC voltage and output a secondary DC voltage; a first feedback controller circuit, used to control the operation of the first transformer rectifier circuit; a secondary transformer rectifier circuit, used to input the first DC voltage and output a third DC voltage; a secondary feedback controller circuit, used to control the operation of the secondary transformer rectifier circuit; a synchronization circuit that outputs a trigger signal when it detects a synchronized signal of analog computer image signal; a switch circuit; a scaler; and a microprocessor, outputs a activating signal to secondary transformer rectifier circuit when it detects the trigger signal wherein the secondary transformer rectifier circuit provides the scaler the required power and allows the scaler to output one voltage reference, and the first transformer rectifier circuit will start to provide the secondary DC voltage to the inverter in accordance with the voltage reference. The 24 V transformer rectifier circuit and the 5V transformer rectifier circuit are independent voltage modes. Thus, the present invention makes it possible that when the monitor is in a power-saving mode, it is not necessary to transfer the voltage required by the microprocessor via the 24V transformer rectifier circuit. The power consumed by the monitor at its power-saving mode can be reduced, and further reduces the waste of resources.

DETAILED DESCRIPTION OF THE PREFERRED EMBODIMENT

Figure 1:
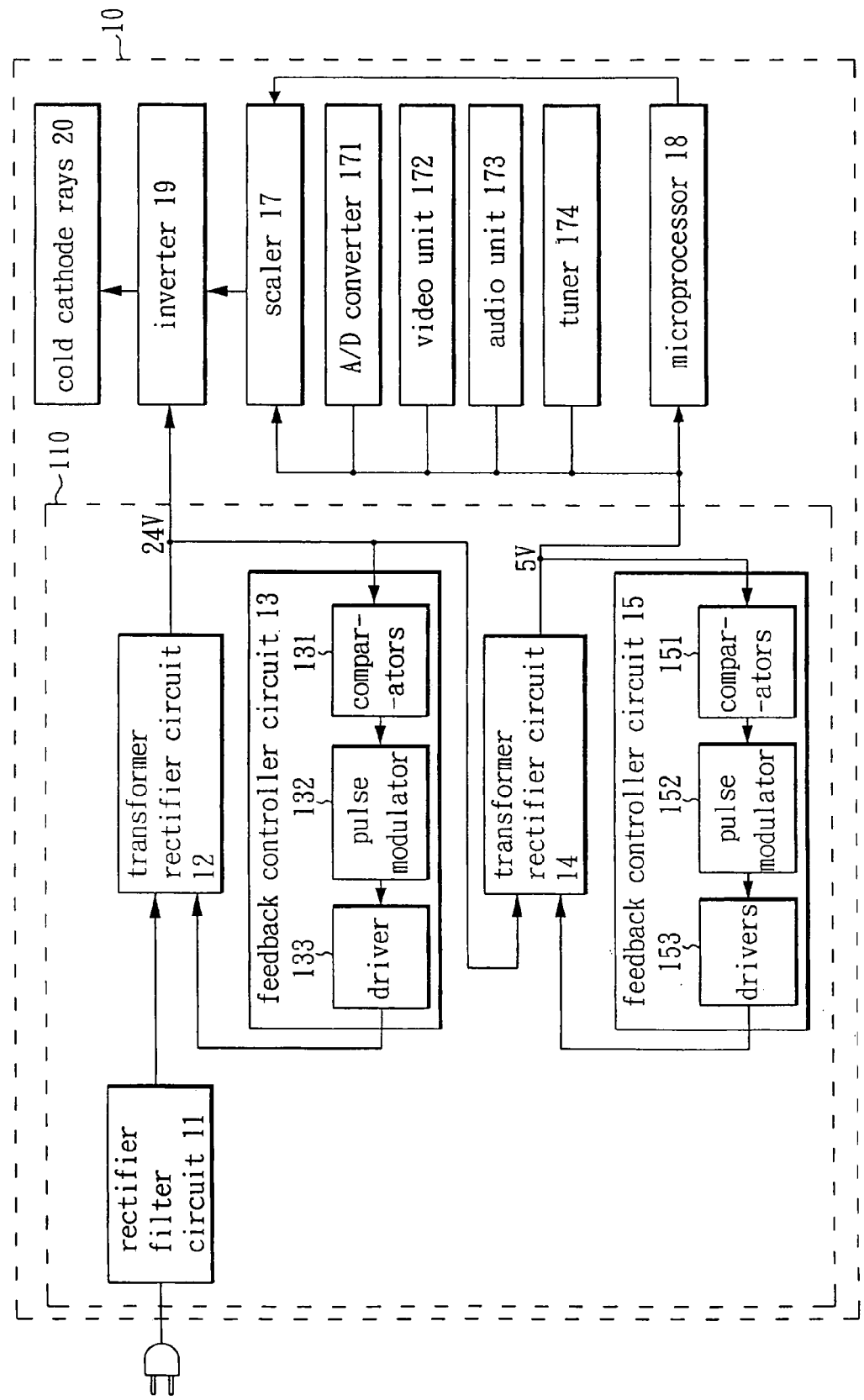
FIG. 1 is a function block diagram of prior art.
Figure 2:
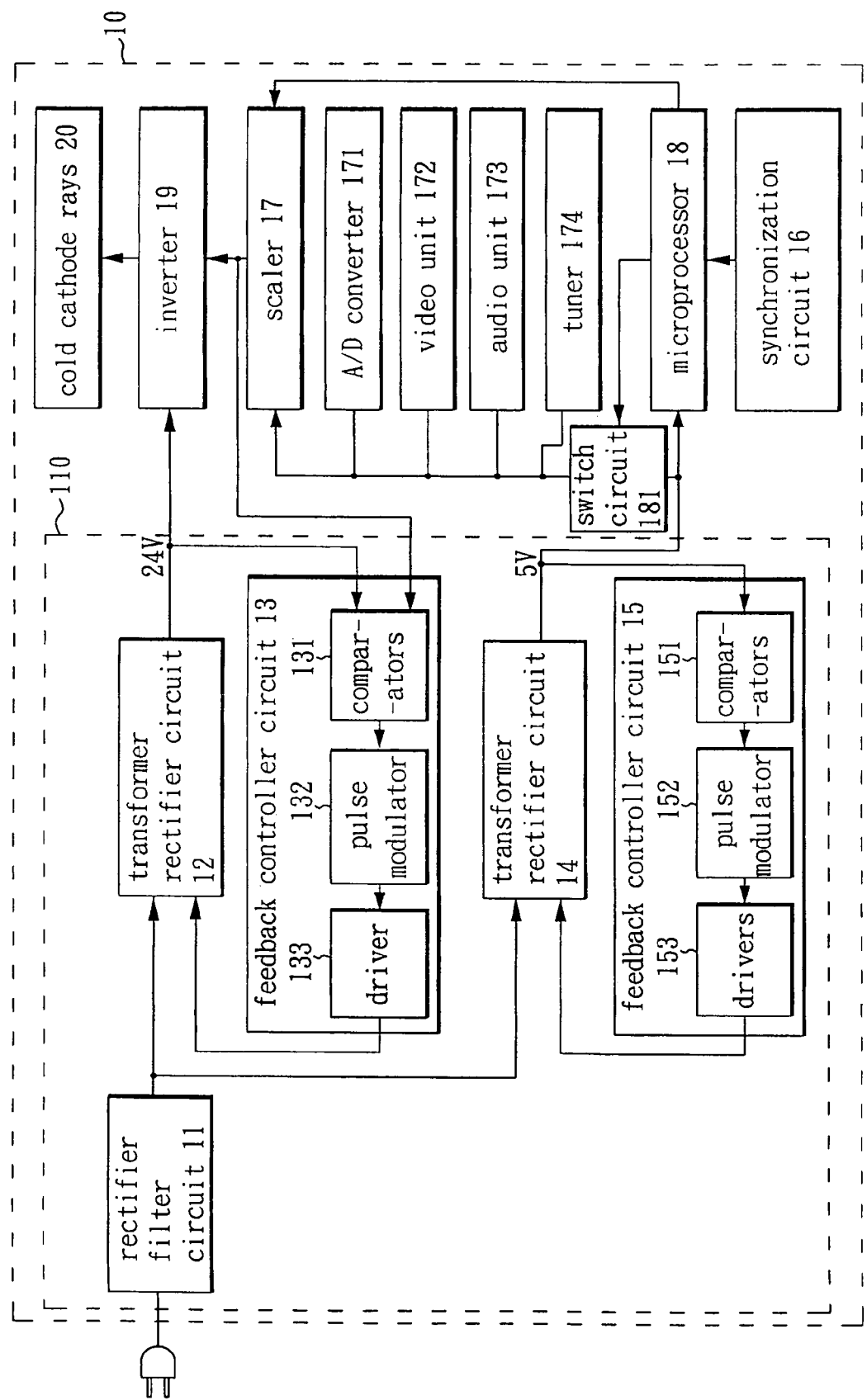
FIG. 2 is a function block diagram of one preferred embodiment of the present invention.

Please refer to the function block diagram of FIG. 2 regarding the TFT display with low loss construction of power supply of the present invention. In this preferred embodiment, the TFT display with low loss construction of power supply is used in an LCD 10 to receive one analog computer image signal, and provide a DC voltage A2 to a inverter 19 of the LCD 10 wherein the inverter 19 can provide the LCD 10 the power/electricity required for operation. The TFT display with low loss construction of power supply comprises: a power supply 110 comprising a rectifier filter circuit 11, a transformer rectifier circuit 12, a feedback controller circuit 13, one transformer rectifier circuit 14, and a feedback controller circuit 15; one synchronization circuit 16; a switch circuit 181; a scaler 17 and a microprocessor 18. In this preferred embodiment, the transformer rectifier circuit 12 is a 24 volts voltage-transition converter, and the transformer rectifier circuit 14 is a 5 volts voltage-transition converter.

The feedback controller circuit 13 and feedback controller circuit 15 are used to control the operation of the transformer rectifier circuit 12 and the transformer rectifier circuit 14, and each respectively comprises comparators 131 and 151, pulse modulators 132 and 152, and drivers 131 and 153. In this preferred embodiment, the drivers 133 and 153 are power transistors. Due to the transformer rectifier circuit 12 and 14 being designed to output large current, the drivers 133 and 153 are adapted to obtain the large current and drive the transformer rectifier circuits 12 and 14 thereof. The source of the transformer rectifier circuits 12 and 14 is the AC voltage inputted by the rectifier filter circuit 11, receiving AC voltage from one external device, and inputted one DC voltage to the transformer rectifier circuits 12 and 14 after being filter rectified.

As shown in FIG. 2, the transformer rectifier circuit 12 and transformer rectifier circuit 14 are independent voltage modes. When the LCD 10 is in the power-saving mode, the microprocessor 18 will set the status of the switch circuit 18118 of LCD 10 to be off, whereby the 5 volts voltage can not pass the switch circuit 181 and hence the 5 volts voltage unable to provide the supply voltage to the scaler 17. Therefore, the scaler 17 is off as well, causing the transformer rectifier circuit 12 to not be able to operate. At the time being, the power required by the microprocessor 18 is be provided by the transformer rectifier circuit 14. When the LCD 10 is in the power-saving mode, the synchronization circuit 16 will detect whether or not there is inputted a synchronized signal of an analog computer image wherein the analog computer image can be inputted by a computer mainframe. If there is an inputted synchronized signal, it means it is desired to restore the LCD 10 from the power-saving mode to the normal mode; and the synchronization circuit 16 will output a trigger signal to the microprocessor 18.

When the microprocessor 18 receives the trigger signal, it will set the status of the switch circuit 181 to be on, and output one activating signal to activate the feedback controller circuit 15. The microprocessor 18 will then at once send out an activating signal to the scaler 17 to proceed the activation of the scaler 17. There is no voltage input to the comparator 151 in the power-saving mode, thus the status of the comparator 151 is off. When the transformer rectifier circuit 14 receives the trigger signal, the comparator 151 will compare the DC voltage to a predetermined voltage level and output a comparing result ON to the pulse modulator 152. The pulse modulators 151 will modulator the comparing result and the DC voltage inputted by rectifier filter circuit 11 and output a modulated pulse to the power transistor 153. The transformer rectifier circuit 15 output the required power by the scaler 17 for operation and makes the scaler 17 to output a voltage reference to the comparator 131 of the feedback controller 13. The DC voltage outputted by the transformer rectifier circuit 14 can also be provided to various elements inside the LCD 10 such as an analog digital transformer/converter 171, a video unit 172, an audio unit 173, and a tuner 174.

When the feedback controller 13 receives the voltage reference inputted by the scaler 17, the comparator will switch its status from initial OFF to ON due to the inputted voltage reference and output comparing result to the pulse modulator 132. A pulse signal will be outputted to the driver 133 after pulse modulation, and further drives the transformer rectifier circuit 12. The transformer rectifier circuit 12 will then transform the DC voltage inputted by the rectifier filter circuit 11 to 24 volts DC voltage, and input the said DC voltage to the inverter 19. Then the inverter 19 will transfer the DC voltage to a DC high voltage to drive the operations of cold cathode rays to precede the displaying functions.

As stated above, the 5V and 24 V voltage modes of the present invention are independent voltage modes. Thus, when the LCD 10 is in power-saving mode, it only requires the 5V voltage mode to provide the power for the operation of the microprocessor 18. The transformer rectifier circuit 12 is activated to drive the LCD 10 to precede the displaying functions once the microprocessor 18 receives the trigger signal. Therefore, the present invention can greatly reduce the power consumed when the LCD 10 is in power-saving mode, attaining the purpose of power saving. It can be readily appreciated that the vast quantity of LCD required by modern society will consume dramatically less power by employing the present invention and the resulting drop in consumption will provide a significant benefit to the environment.

Although the present invention has been explained in relation to its preferred embodiment, it is to be understood that many other possible modifications and variations can be made without departing from the spirit and scope of the invention as hereinafter claimed.

What is claimed is:

1. A TFT display with low loss construction of power supply to be used in a monitor to receive an analog computer image signal and provide a secondary DC voltage to an inverter of the monitor wherein the inverter provides the required power for functioning of the monitor; the TFT display with low loss construction of power supply comprises:

a voltage supply device, comprising:

a rectifier filter circuit, used to input an AC voltage and output a first DC voltage;

a first transformer rectifier circuit, used to input a first DC voltage and output a secondary DC voltage;

a first feedback controller circuit, used to control operation of the first transformer rectifier circuit;

a secondary transformer rectifier circuit, used to input the first DC voltage and output a third DC voltage; and a secondary feedback controller circuit, used to control operation of the secondary transformer rectifier circuit;

a synchronization circuit, outputting a trigger signal when a synchronized signal of an analog computer image signal is detected;

a switch circuit;

a scaler; and a microprocessor, setting the switch circuit to be off for disabling the third DC voltage from passing through the switch circuit when the TFT display is in a power-saving mode, and thus preventing the third DC voltage from being supplied to the scaler thereby turning off the scaler and causing the first transformer rectifier circuit not to operate; and outputting an activating signal to the secondary transformer rectifier circuit when the trigger signal is detected, wherein the secondary transformer rectifier circuit provides the scaler the required power and allows the scaler to output a voltage reference, and the first transformer rectifier circuit starts to provide the secondary DC voltage to the inverter in accordance with the voltage reference.

2. A TFT display with low loss construction of power supply as claimed in claim 1 wherein the first transformer rectifier circuit is a 24 volts voltage-transition converter.

3. A TFT display with low loss construction of power supply as claimed in claim 1 wherein the secondary transformer rectifier circuit is a 5 volts voltage-transition converter.

4. A TFT display with low loss construction of power supply as claimed in claim 1 wherein the first feedback controller circuit comprises:

a comparator, comparing the said secondary DC voltage and the voltage reference outputted by the scaler, and outputting one comparing result;

a pulse modulator, pulse modulating the comparing result to the AC voltage inputted by an external device and outputting a modulated pulse; and a driver receiving the modulated pulse and driving the first transformer rectifier circuit.

5. A TFT display with low loss construction of power supply as claimed in claim 4 wherein the driver is a power transistor.

6. A TFT display with low loss construction of power supply as claimed in claim 1 wherein the secondary feedback controller circuit comprises:

a comparator, comparing the third DC voltage to one predetermined voltage level, and outputting a comparing result;
a pulse modulator, pulse modulating the comparing result to the AC voltage inputted by an external device and outputting a modulated pulse; and
a driver receiving the modulated pulse and driving the secondary transformer rectifier circuit.

7. A TFT display with low loss construction of power supply as claimed in claim 6 wherein the driver is a power transistor.

8. A TFT display with low loss construction of power supply as claimed in claim 6 wherein the monitor is a large-sized LCD meeting with a power-saving requirement.

* * * * *